US012587911B2

(12) United States Patent
Laselva et al.

(10) Patent No.: US 12,587,911 B2
(45) Date of Patent: Mar. 24, 2026

(54) APPARATUS COMPRISING AT LEAST ONE PROCESSOR

(71) Applicant: Nokia Solutions and Networks Oy, Espoo (FI)

(72) Inventors: Daniela Laselva, Aalborg (DK); Samuli Turtinen, Oulu (FI); Jussi-Pekka Koskinen, Oulu (FI); Philippe Godin, Massy (FR); Subramanya Chandrashekar, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 340 days.

(21) Appl. No.: 18/252,686

(22) PCT Filed: Nov. 29, 2021

(86) PCT No.: PCT/EP2021/083373
§ 371 (c)(1),
(2) Date: May 11, 2023

(87) PCT Pub. No.: WO2022/128429
PCT Pub. Date: Jun. 23, 2022

(65) Prior Publication Data
US 2024/0015605 A1 Jan. 11, 2024

(30) Foreign Application Priority Data
Dec. 17, 2020 (EP) ..................................... 20214968

(51) Int. Cl.
*H04W 36/38* (2009.01)
*H04W 36/00* (2009.01)

(52) U.S. Cl.
CPC ....... *H04W 36/0033* (2013.01); *H04W 36/38* (2013.01)

(58) Field of Classification Search
None
See application file for complete search history.

(56) References Cited

U.S. PATENT DOCUMENTS

2019/0059128 A1 2/2019 Gage et al.
2020/0037210 A1 1/2020 Rugeland et al.
(Continued)

FOREIGN PATENT DOCUMENTS

EP 3639551 A1 4/2020
WO 2018/229299 A1 12/2018
(Continued)

OTHER PUBLICATIONS

"Work Item on NR smalldata transmissions in INACTIVE state", 3GPP TSG RAN Meeting #88e, RP-201305, Agenda: 9.1.2, ZTE Corporation, Jun. 29-Jul. 3, 2020, 5 pages.
(Continued)

*Primary Examiner* — Kodzovi Acolatse
(74) *Attorney, Agent, or Firm* — Barta Jones, PLLC

(57) ABSTRACT

An apparatus, comprising at least one processor, and at least one memory storing instructions, the at least one memory and the instructions configured to, with the at least one processor, cause a target node to signal to an anchor node a first information related to a context relocation of a context of a terminal device.

6 Claims, 7 Drawing Sheets

(56) References Cited

U.S. PATENT DOCUMENTS

| | | | | |
|---|---|---|---|---|
| 2022/0094764 A1* | 3/2022 | Kim | ......................... | H04W 4/18 |
| 2022/0124555 A1 | 4/2022 | Godin et al. | | |
| 2023/0083985 A1* | 3/2023 | Kim | ...................... | H04W 76/27 |
| | | | | 370/329 |
| 2023/0388395 A1* | 11/2023 | Xu | .......................... | H04L 67/60 |

FOREIGN PATENT DOCUMENTS

| | | | |
|---|---|---|---|
| WO | 2020/092527 A1 | 5/2020 | |
| WO | 2020/166872 A1 | 8/2020 | |
| WO | 2020/189958 A1 | 9/2020 | |
| WO | 2022/074502 A1 | 4/2022 | |
| WO | 2022/078867 A1 | 4/2022 | |
| WO | 2022/083921 A1 | 4/2022 | |

OTHER PUBLICATIONS

"SDT mechanism on RRC/non-RRC based approaches and RACH requirements", 3GPP Tsg Ran WG2 Meeting #111-e, R2-2006713, Agenda: 8.6.2, Intel Corporation, Aug. 17-28, 2020, 10 pages.

"Radio bearer configuration for SDT considering UE context relocation and CU/DU split", 3GPP TSG RAN WG2 Meeting #111-e, R2-2006714, Agenda: 8.6.2, Intel Corporation, Aug. 17-28, 2020, 6 pages.

"3rd Generation Partnership Project; Technical Specification Group Radio Access Network; NR; User Equipment (UE) radio access capabilities (Release 16)", 3GPP TS 38.306, V16.2.0, Sep. 2020, pp. 1-126.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"RACH based uplink small data transmission with or without anchor relocation", 3GPP TSG-RAN WG2 Meeting #111e, R2-2007541, Agenda: 8.6.2, Qualcomm Incorporated, Aug. 17-28, 2020, pp. 1-4.

"3rd Generation Partnership Project; Technical Specification Group Radio Access Network; NG-RAN; F1 application protocol (F1AP) (Release 16)", 3GPP TS 38.473, V16.3.0, Sep. 2020, pp. 1-455.

"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.

"Small data transmission with RA-based schemes", 3GPP TSG-RAN WG2 Meeting #111e, R2-2006583, Agenda: 8.6.2, Huawei, Aug. 17-28, 2020, pp. 1-8.

"UL small data transmissions in 2-step RACH and 4-step RACH", 3GPP TSG-RAN WG2 Meeting RAN2#111 electronic, R2-2007469, Agenda: 8.6.2, Lenovo, Aug. 17-28, 2020, pp. 1-4.

"(TP for NR BL CR for TS 38.423): Correction to RNAU without context relocation", 3GPP TSG-RAN3 Meeting #102, R3-187115, Agenda: 31.3.4.1, Huawei, Nov. 12-16, 2018, 4 pages.

Extended European Search Report received for corresponding European Patent Application No. 20214968.8, dated Jun. 9, 2021, 11 pages.

"Analysis on SDT without context relocation", 3GPP TSG-RAN WG2 Meeting #112 electronic, R2-2009368, Agenda: 8.6.5, CATT, Nov. 2-13, 2020, 5 pages.

"Considerations on general aspects and subsequent SDT", 3GPP TSG-RAN WG2 Meeting #112 e, R2-2009367, Agenda: 8.6.3, CATT, Nov. 2-13, 2020, 6 pages.

"Security aspects of SDT", 3GPP TSG-RAN WG2 Meeting #112 electronic, R2-2009920, Agenda: 8.6.2, Nokia, Nov. 2-13, 2020, 5 pages.

International Search Report and Written Opinion received for corresponding Patent Cooperation Treaty Application No. PCT/EP2021/083373, dated Mar. 15, 2022, 13 pages.

Office action received for corresponding European Patent Application No. 20214968.8, dated Apr. 22, 2025, 7 pages.

* cited by examiner

Fig. 4

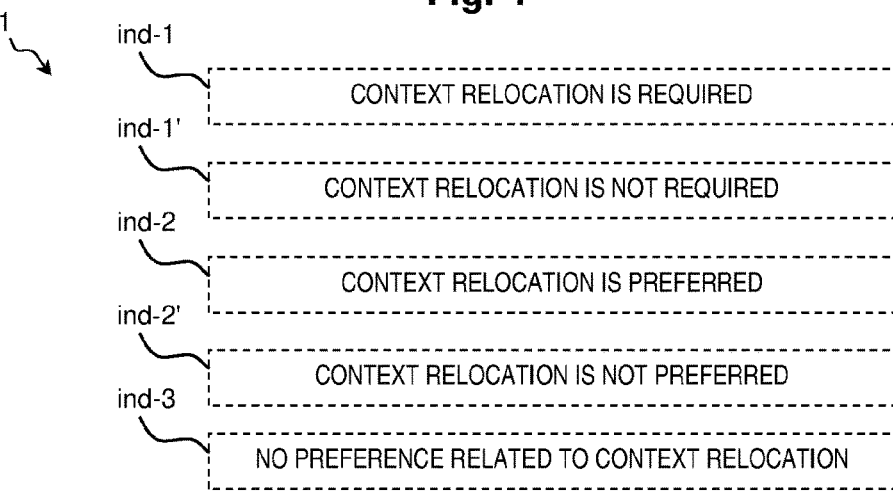

I-1 ind-1 — CONTEXT RELOCATION IS REQUIRED ind-1' — CONTEXT RELOCATION IS NOT REQUIRED ind-2 — CONTEXT RELOCATION IS PREFERRED ind-2' — CONTEXT RELOCATION IS NOT PREFERRED ind-3 — NO PREFERENCE RELATED TO CONTEXT RELOCATION

Fig. 5

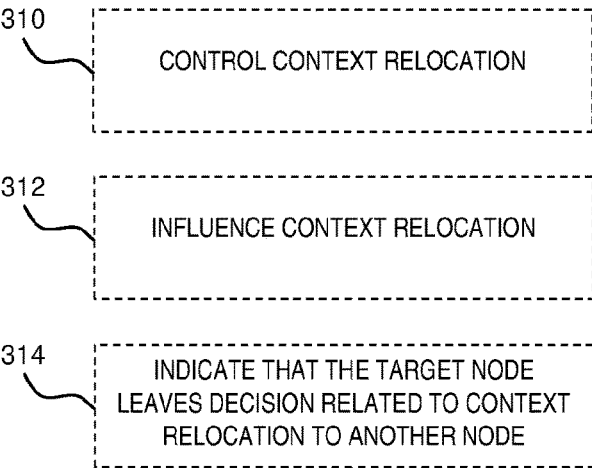

310 — CONTROL CONTEXT RELOCATION

312 — INFLUENCE CONTEXT RELOCATION

314 — INDICATE THAT THE TARGET NODE LEAVES DECISION RELATED TO CONTEXT RELOCATION TO ANOTHER NODE

Fig. 6

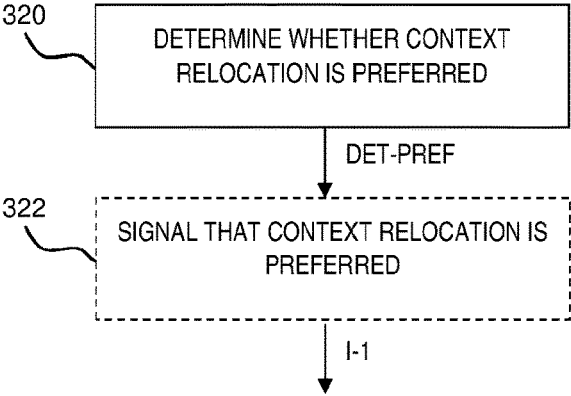

320 — DETERMINE WHETHER CONTEXT RELOCATION IS PREFERRED

DET-PREF

322 — SIGNAL THAT CONTEXT RELOCATION IS PREFERRED

I-1

330   RECEIVE CONTEXT OF TERMINAL DEVICE

CTXT

332   OPERATE AS ANCHOR NODE FOR TERMINAL DEVICE

340   SEND MESSAGE INCLUDED IN SMALL DATA TRANSMISSION TO CENTRAL UNIT OF TARGET NODE

SDT-MSG

342   SEND INDICATION INDICATING REQUEST FOR SMALL DATA TRANSMISSION

IND-SDT

350   TRIGGER SIGNALING OF FIRST INFORMATION TO THE ANCHOR NODE          TC-1, TC-2, TC-3

352   SIGNAL FIRST INFORMATION TO ANCHOR NODE

Fig. 10

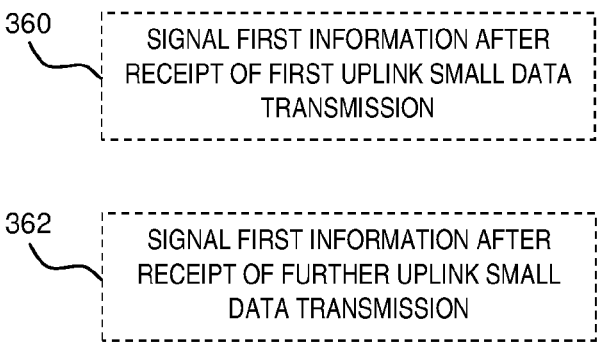

360 — SIGNAL FIRST INFORMATION AFTER RECEIPT OF FIRST UPLINK SMALL DATA TRANSMISSION

362 — SIGNAL FIRST INFORMATION AFTER RECEIPT OF FURTHER UPLINK SMALL DATA TRANSMISSION

Fig. 11

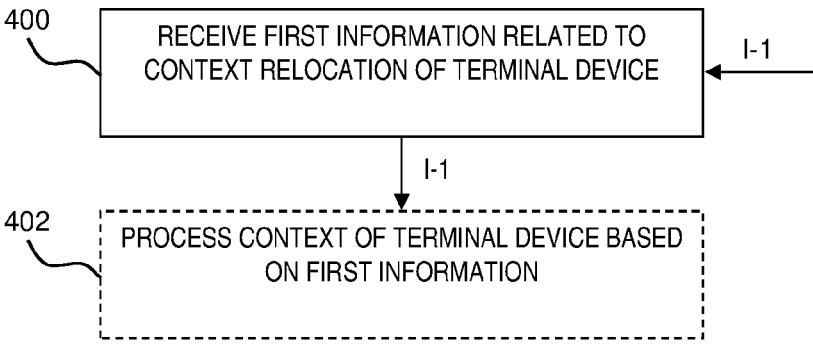

400 — RECEIVE FIRST INFORMATION RELATED TO CONTEXT RELOCATION OF TERMINAL DEVICE        I-1

I-1

402 — PROCESS CONTEXT OF TERMINAL DEVICE BASED ON FIRST INFORMATION

Fig. 12

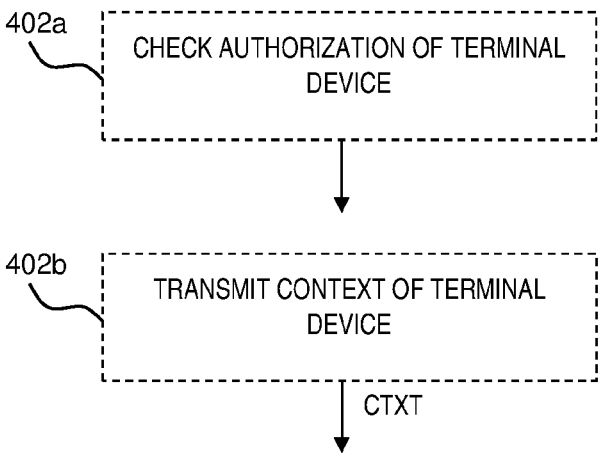

402a — CHECK AUTHORIZATION OF TERMINAL DEVICE

402b — TRANSMIT CONTEXT OF TERMINAL DEVICE

CTXT

100'

102'

200'

202'

APPARATUS COMPRISING AT LEAST ONE PROCESSOR

RELATED APPLICATION

This application was originally filed as PCT Application No. PCT/EP2021/083373, filed on Nov. 29, 2021, which claims priority from EP application Ser. No. 20214968.8, filed on Dec. 17, 2020, each of which is incorporated herein by reference in its entirety.

FIELD OF THE DISCLOSURE

Various example embodiments relate to an apparatus comprising at least one processor.

Further embodiments relate to a method of operating related to such apparatus.

BACKGROUND

Wireless communications systems may e.g. be used for wireless exchange of information between two or more entities, e.g. comprising one or more terminal devices, e.g. user equipment (UE), and one or more network devices such as e.g. base stations, the base stations e.g. providing radio cells for serving terminal devices such as the UE.

Some UE may perform a handover from a last serving node, which may also be referred to as "anchor node", to a target node. Some UE may perform a small data transmission procedure, e.g. for machine-to-machine (M2M)-type communications.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus, comprising at least one processor, and at least one memory storing instructions, the at least one memory and the instructions configured to, with the at least one processor, cause a target node to signal to an anchor node a first information related to a context relocation of a context of a terminal device. In some embodiments, this enables the target node for example to have a flexible behavior in respect of the context relocation for the terminal device.

In some embodiments, the first information may characterize a preference of the target node related to the context relocation of the context of the terminal device.

In some embodiments, the first information may characterize a request of the target node related to the context relocation of the context of the terminal device.

In some embodiments, the apparatus may be an apparatus for a wireless communications system.

In some embodiments, the apparatus or its functionality, respectively, may be provided for and/or in a network device of the communications system, for example in a base station.

In some embodiments, the network device may be a base station, e.g. a gNodeB (gNB), e.g. for the wireless communications system.

In some embodiments, the gNB may at least temporarily assume the role of the target node, e.g. for a handover procedure.

In some embodiments, the role of the anchor node may also at least temporarily be assumed by a (e.g., another) base station, e.g. gNB, e.g. for the wireless communications system. As already mentioned above, the anchor node may be a last serving node, e.g. last serving gNB.

In some embodiments, the apparatus according to the embodiments or its functionality, respectively, may be used for or within wireless communications systems, e.g. networks, based on or at least partially adhering to third generation partnership project, 3GPP, radio standards such as 5G (fifth generation), e.g. 5G NR (new radio), or other radio access technology.

In some embodiments, the first information comprises at least one of: a) an indication, e.g. of the target node, that the context relocation is required (e.g., mandated to happen), b) an indication, e.g. of the target node, that the context relocation is not required, c) an indication, e.g. of the target node, that the context relocation is preferred, d) an indication, e.g. of the target node, that the context relocation is not preferred, e) an indication, e.g. of the target node, that the target node has no preference regarding the context relocation.

In some embodiments, the target node may indicate that the context relocation is not preferred based on a load in a cell provided by the target node.

In some embodiments, the instructions, when executed by the at least one processor, cause the target node to receive an uplink transmission, e.g. an uplink small data transmission (SDT) from the terminal device. In some embodiments, receiving such uplink transmission, e.g. an uplink SDT from the terminal device, may trigger the target node to signal the first information.

In some embodiments, the instructions, when executed by the at least one processor, cause the target node to perform at least one of: a) controlling a context relocation decision, b) influencing a decision related to the context relocation, c) indicating that the target node leaves a or the decision related to the context relocation to another node.

In some embodiments, controlling the context relocation e.g. enables the target node to be in control of a context relocation decision, e.g. when this may be essential, e.g. for moving the terminal device to a connected mode, e.g. a radio resource control (RRC) Connected mode, e.g. when non-SDT data is present.

In some embodiments, influencing the context relocation e.g. enables the target node to influence a context relocation decision taken by the anchor node, wherein in some embodiments the influencing may be based on e.g. internal constraints, e.g. characterizing if the target node experiences overload situations.

In some embodiments, the instructions, when executed by the at least one processor, cause the target node to determine whether the context relocation is preferred, and, optionally, to signal the preference, for example, if the context relocation is preferred, to signal that the context relocation is preferred.

In some embodiments, the preference may be based on e.g. a current load level in the target node, the radio conditions of the given terminal device, whether a mobility event is imminent, or an amount of data for transmission.

In some embodiments, there may be cases where there is no strong view from the target node, e.g. because it does not plan to move a terminal device, e.g. UE, to a connected mode, e.g. RRC_CONNECTED mode, and it does not suffer from overload. In these cases, in some embodiments, the decision regarding context relocation may thus be left to the anchor node, which, in some embodiments, may e.g. take advantage of other information stored in context of the terminal device to make the decision (e.g. mobility pattern, activity or traffic pattern, etc., downlink (DL) data currently buffered).

In some embodiments, the instructions, when executed by the at least one processor, cause the target node to determine whether the context relocation is required, e.g. mandated, and, optionally, if the context relocation is required, to signal that the context relocation is required. In some embodiments, the target node may determine whether the context relocation is required based on a decision that a terminal device should be moved to a connected mode, e.g. RRC-_CONNECTED mode.

In some embodiments, the instructions, when executed by the at least one processor, cause the target node to receive the context of the terminal device, e.g. from the anchor node, and, optionally, to operate as an anchor node for the terminal device.

In some embodiments, the target node receives the context of the terminal device and operates as an anchor node upon sending a request for an anchor relocation.

In some embodiments, the target node may or may not receive the context of the terminal device upon sending a preference or no preference, e.g. using the first information.

In some embodiments, the context of the terminal device may be received by the target node in response to the signaling of the first information.

In some embodiments, the target node may move the terminal device to a connected mode, e.g. RRC_CON-NECTED mode, or to an inactive mode, e.g. RRC_INAC-TIVE mode.

In some embodiments, the first information may be signaled, e.g. using an existing message, e.g. a Xn-Application Protocol (Xn-AP) message such as a Xn-AP RETRIEVE UE CONTEXT REQUEST message which, in some embodiments, may or may not piggyback uplink data of the terminal device.

In some embodiments, the signaling of the first information may be triggered by a reception at the target node of a first uplink SDT transmission from the terminal device.

In some embodiments, the target node may use a new Xn-AP message for SDT, denoted e.g. "Initial Inactive UL data transfer" message, in which the first information, e.g. indication of context relocation required/not required, preferred/not preferred, no preference, may be provided.

In some embodiments, the instructions, when executed by the at least one processor, cause a distributed unit of the target node to perform at least one of: a) sending a message included in a small data transmission, e.g. in an initial uplink RRC message, to a central unit of the target node, e.g. upon receiving a first uplink SDT transmission from the terminal device, b) sending an indication to a or the central unit of the target node indicating a request of the terminal device for small data transmission.

In some embodiments, the distributed unit of the target node may determine whether there is a request of the terminal device for small data transmission based on specific random access channel, RACH, resources.

In some embodiments, the instructions, when executed by the at least one processor, cause the target node to trigger the signalling of the first information to the anchor node based on receiving, at a central unit of the target node, a copy of at least one of aa) a buffer status report and bb) a data volume report by a distributed unit of the target node.

In some embodiments, the instructions, when executed by the at least one processor, cause the target node to trigger the signalling of the first information to the anchor node based on at least one of: a) a buffer status report associated with the terminal device exceeds a predetermined threshold, b) an uplink small data transmission from the terminal device contains an indication that non-small data transmission ("non-SDT") data is present in a buffer of the terminal device.

In some embodiments, e.g. for the purpose of the distributed unit of the target node to inform the central unit of the target node, e.g. the control plane (CP) of the central unit of the target node (gNB-CU-CP), of the fact that "more data is expected", an, e.g. novel, indication from the distributed unit of the target node to the central unit of the target node may be provided, which, in some embodiments, may also include e.g. a BSR.

In some embodiments, e.g. for the purpose of the distributed unit of the target node to inform the gNB-CU-CP of non-SDT data, an indication, e.g. novel indication, from the distributed unit of the target node to the central unit of the target node may be introduced.

In some embodiments, the instructions, when executed by the at least one processor, cause the target node to perform at least one of: a) signalling the first information after receipt of a first uplink small data transmission, e.g. from the terminal device, b) signalling the first information after receipt of a further, e.g. other than first, uplink small data transmission, e.g. from the terminal device.

In some embodiments, the signaling of the first information may be triggered by a reception at the target node of a subsequent, i.e. further (e.g., other than first), UL SDT transmission from a terminal device, e.g. in a situation where an SDT transmission has been started, e.g. without anchor relocation. In some embodiments, in this case, the target node may e.g. provide an indication, e.g. a novel indication, about context relocation either: 1. as a part of a subsequent message, e.g. subsequent Xn-AP RETRIEVE UE CONTEXT REQUEST message, e.g. if the context relocation is determined to be "required" or "preferred", or 2. in a new message, e.g. a new Xn-AP message, e.g. denoted "Inactive UL data transfer" message in the following without loss of generality, with or without uplink data, which may e.g. prompt the anchor node to trigger the context provisioning and/or an Xn-AP handover procedure to the target node.

In some embodiments, the signaling of the first information may be triggered by a reception at the target node of an indication of the terminal device of new data (e.g. a scheduling request, SR, BSR, etc.), which may e.g. be received after a first UL SDT transmission. For example, if the indication of the terminal device indicates the presence of non-SDT data in the buffer of the terminal device, in some embodiments this may trigger the target node to initiate a context retrieve (and anchor relocation), e.g., before the data is received from the terminal device.

In some embodiments, the indication that context relocation is required is triggered based on at least one of: a) receiving information that data not eligible for small data transmission is present in a buffer of the terminal device, b) receiving information that a buffer amount of the terminal device exceeds a threshold, and/or wherein the indication that a context relocation is not required or the indication that a context relocation is not preferred is triggered by at least one of: a) a load condition of the target cell, b) a capability of the target cell in respect to service and/or security support or in respect to a lack of service and/or security support in the target cell.

In some embodiments, the indication that context relocation is required or the indication that a context relocation is preferred includes at least one of an indication of presence of non-small data in a buffer of the terminal device, and information related to the decision to perform a legacy connection resume.

In some embodiments, the indication that a context relocation is not required or the indication that a context relocation is not preferred includes at least one of: a) information related to a load condition of the target cell, b) information related to a capability of the target cell in respect to service and/or security support or in respect to a lack of service and/or security support in the target cell.

Some embodiments relate to a method, comprising: signaling, by a target node, to an anchor node a first information related to a context relocation of a context of a terminal device.

Some embodiments relate to an apparatus, comprising at least one processor, and at least one memory storing instructions, the at least one memory and the instructions configured to, with the at least one processor, cause an anchor node to receive a first information related to a context relocation of a context of a terminal device.

In some embodiments, the instructions, when executed by the at least one processor, cause the anchor node to perform at least one of: a) checking an authorization of the terminal device, b) sending a context of the terminal device to the target node, for example based on the first information (I-1).

Some embodiments relate to a method, comprising: receiving, by an anchor node, a first information related to a context relocation of a context of a terminal device.

Some embodiments relate to an apparatus comprising means for causing a target node to signal to an anchor node a first information related to a context relocation of a context of a terminal device. In some embodiments, the means may e.g. comprise at least one processor, and at least one memory storing instructions, the at least one memory and the instructions configured to, with the at least one processor, perform the step of causing the target node to signal to the anchor node the first information.

Some embodiments relate to an apparatus comprising means for causing an anchor node to receive a first information related to a context relocation of a context of a terminal device. In some embodiments, the means may e.g. comprise at least one processor, and at least one memory storing instructions, the at least one memory and the instructions configured to, with the at least one processor, perform the step of causing the anchor node to receive the first information.

Some embodiments relate to a wireless communications system comprising at least one apparatus according to the embodiments.

DESCRIPTION OF SOME EXEMPLARY EMBODIMENTS

Some embodiments relate to an apparatus, e.g. for a network device, e.g. of a wireless communications system.

Figure 1A:
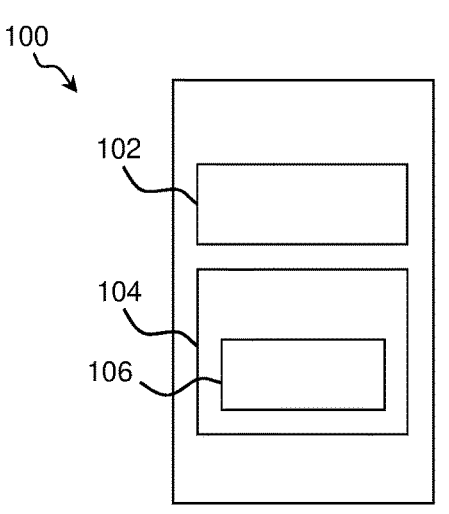
FIG. 1A schematically depicts a simplified block diagram of an apparatus according to some embodiments, FIG. 1B schematically depicts a simplified block diagram of an apparatus according to some embodiments, FIG. 2 schematically depicts a simplified block diagram according to some embodiments, FIG. 3 schematically depicts a simplified flow chart according to some embodiments, FIG. 4 schematically depicts a simplified block diagram according to some embodiments, FIG. 5 schematically depicts a simplified flow chart according to some embodiments, FIG. 6 schematically depicts a simplified flow chart according to some embodiments, FIG. 7 schematically depicts a simplified flow chart according to some embodiments, FIG. 8 schematically depicts a simplified flow chart according to some embodiments, FIG. 9 schematically depicts a simplified flow chart according to some embodiments, FIG. 10 schematically depicts a simplified flow chart according to some embodiments, FIG. 11 schematically depicts a simplified flow chart according to some embodiments, FIG. 12 schematically depicts a simplified flow chart according to some embodiments, FIG. 13 schematically depicts a simplified flow chart according to some embodiments, FIG. 14 schematically depicts a simplified flow chart according to some embodiments, FIG. 15 schematically depicts a simplified block diagram of an apparatus according to some embodiments, and, FIG. 16 schematically depicts a simplified block diagram of an apparatus according to some embodiments.
Figure 2:
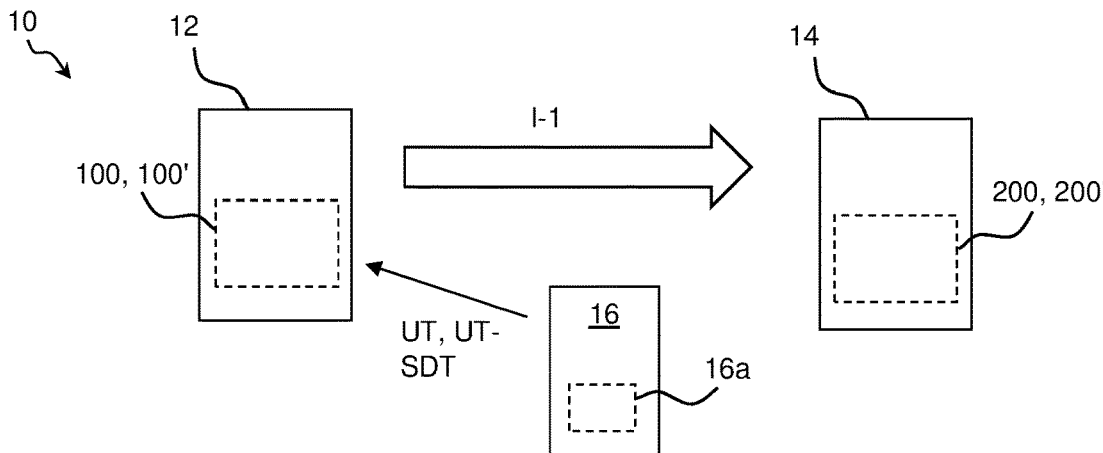
Figure 3:
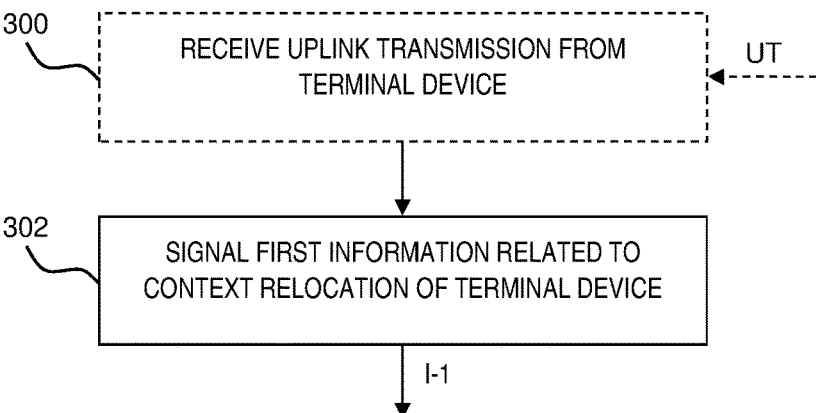

FIG. 1A schematically depicts a simplified block diagram of the apparatus 100 according to some embodiments, FIG. 2 schematically depicts a simplified block diagram of a wireless communications system 10 according to some embodiments, and FIG. 3 schematically depicts a simplified flow chart of a method associated with the apparatus 100 according to some embodiments.

The apparatus 100 comprises at least one processor 102, and at least one memory 104 storing instructions 106, the at least one memory 104 and the instructions 106 configured to, with the at least one processor 102, cause a target node 12 (FIG. 2) to signal 302 (FIG. 3) to an anchor node 14 (FIG. 2) a first information I-1 related to a context relocation of a context of a terminal device 16. In some embodiments, this enables the target node 12 for example to have a flexible behavior in respect of the context relocation for the terminal device 16.

In some embodiments, the first information I-1 may characterize a preference of the target node 12 related to the context relocation of the context of the terminal device 16.

In some embodiments, the first information I-1 may characterize a request of the target node 12 related to the context relocation of the context of the terminal device 16.

In some embodiments, the apparatus 100 or its functionality, respectively, may be provided for and/or in a network device 12 of the communications system 10, for example in a base station.

In some embodiments, the network device 12 may be a base station, e.g. a gNodeB (gNB), e.g. for the wireless communications system 10.

In some embodiments, the gNB may at least temporarily assume the role of the target node 12, e.g. for a handover procedure.

In some embodiments, the role of the anchor node 14 may also at least temporarily be assumed by a (e.g., another) base station, e.g. gNB, e.g. for the wireless communications system 10. As already mentioned above, the anchor node 14 may be a last serving node, e.g. last serving gNB, of the terminal device 16.

In some embodiments, the apparatus 100 (FIG. 1A) according to the embodiments or its functionality, respectively, may be used for or within wireless communications systems, e.g. networks, based on or at least partially adhering to third generation partnership project, 3GPP, radio standards such as 5G (fifth generation), e.g. 5G NR (new radio), or other radio access technology.

In some embodiments, FIG. 4, the first information I-1 comprises at least one of: a) an indication ind-1, e.g. of the target node 12, that the context relocation is required (e.g., mandated to happen), b) an indication ind-1', e.g. of the target node 12, that the context relocation is not required, c) an indication ind-2, e.g. of the target node 12, that the context relocation is preferred, d) an indication ind-2', e.g. of the target node 12, that the context relocation is not preferred, e) an indication ind-3, e.g. of the target node 12, that the target node 12 has no preference regarding the context relocation.

In some embodiments, the instructions 106 (FIG. 1A), when executed by the at least one processor 102, cause the target node 12 to receive 300 (FIG. 3) an uplink transmission UT, e.g. an uplink small data transmission (SDT) from the terminal device 16. In some embodiments, receiving 300 such uplink transmission UT, e.g. an uplink SDT from the terminal device 16, may trigger the target node 12 to signal 302 the first information I-1.

In some embodiments, FIG. 5, the instructions 106, when executed by the at least one processor 102, cause the target node 12 to perform at least one of: a) controlling 310 a context relocation decision, b) influencing 312 a decision related to the context relocation, c) indicating 314 that the target node 12 leaves a or the decision related to the context relocation to another node, e.g. the anchor node 14.

In some embodiments, for either one of the blocks 310, 312, 314, the signaling 302 of the first information I-1 may be used.

In some embodiments, controlling 310 the context relocation e.g. enables the target node 12 to be in control of a context relocation decision, e.g. when this may be essential, e.g. for moving the terminal device 16 (FIG. 2) to a connected mode, e.g. a radio resource control RRC CONNECTED mode, e.g. when non-SDT data is present.

In some embodiments, influencing 312 the context relocation e.g. enables the target node 12 to influence a context relocation decision taken by the anchor node 14, wherein in some embodiments the influencing 312 may be based on e.g. internal constraints, e.g. characterizing if the target node 12 experiences overload situations.

In some embodiments, FIG. 6, the instructions 106, when executed by the at least one processor 102, cause the target node 12 to determine 320 whether the context relocation is preferred, and, optionally, to signal 322 the preference, for example if a determination DET-PREF is made that the context relocation is preferred, to signal 322 that the context relocation is preferred, e.g. to the anchor node 14, e.g. using the first information I-1.

In some embodiments, the preference may be based on e.g. a current load level in the target node 12, the radio conditions of the given terminal device 16, whether a mobility event is imminent, or an amount of data for transmission.

In some embodiments, there may be cases where there is no strong view from the target node 12, e.g. because it does not plan to move a terminal device 16, e.g. UE, to a connected mode, e.g. RRC_CONNECTED mode, and it does not suffer from overload. In these cases, in some embodiments, the decision regarding context relocation may thus be left to the anchor node 14, which, in some embodiments, may e.g. take advantage of other information stored in context of the terminal device 16 to make the decision (e.g. mobility pattern, activity or traffic pattern, etc., downlink (DL) data currently buffered).

In some embodiments, the instructions 106, when executed by the at least one processor 102, cause the target node 12 (FIG. 2) to determine whether the context relocation is required, e.g. mandated, and, optionally, if the context relocation is required, to signal that the context relocation is required, e.g. to the anchor node 14, e.g. using the first information I-1.

In some embodiments, the instructions 106, when executed by the at least one processor 102, cause the target node 12 (FIG. 2) to determine whether there is a preference related to context relocation, e.g. whether the target node 12 has a preference related to the context relocation, and, optionally, if the determination yields that there is no preference related to the context relocation, e.g. the target node 12 does not have a preference related to the context relocation, to signal that there is no preference related to the context relocation, e.g. to the anchor node 14, e.g. using the first information I-1.

In some embodiments, the target node 12 may determine whether the context relocation is required based on a decision that a terminal device 16 should be moved to a connected mode, e.g. RRC_CONNECTED mode.

Figure 7:
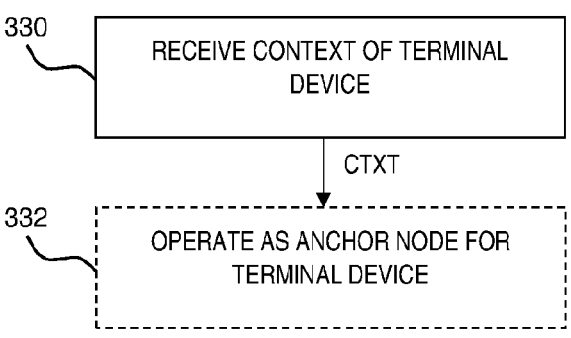

In some embodiments, FIG. 7, the instructions 106, when executed by the at least one processor 102, cause the target node 12 to receive 330 the context CTXT of the terminal device 16, e.g. from the anchor node 14, and, optionally, to operate 332 as an anchor node for the terminal device 16.

In some embodiments, the context CTXT of the terminal device 16 may be received by the target node 12 in response to the signaling 302 (FIG. 3) of the first information I-1.

In some embodiments, the target node 12 may move the terminal device 16 to a connected mode, e.g. RRC_CONNECTED mode, or to an inactive mode, e.g. RRC_INACTIVE mode.

In some embodiments, the first information I-1 may be signaled, e.g. using an existing message, e.g. a Xn-Application Protocol (Xn-AP) message such as a Xn-AP RETRIEVE UE CONTEXT REQUEST message which, in some embodiments, may or may not piggyback uplink data of the terminal device 16.

In some embodiments, the signaling 302 of the first information I-1 may be triggered by a reception at the target node 12 of a first uplink SDT transmission UT-SDT (FIG. 2) from the terminal device 16.

In some embodiments, the target node 12 may use a new Xn-AP message for SDT, denoted e.g. "Initial Inactive UL data transfer" message, in which the first information I-1, e.g. indication of context relocation required/not required, preferred/not preferred, no preference, may be provided.

Figure 8:
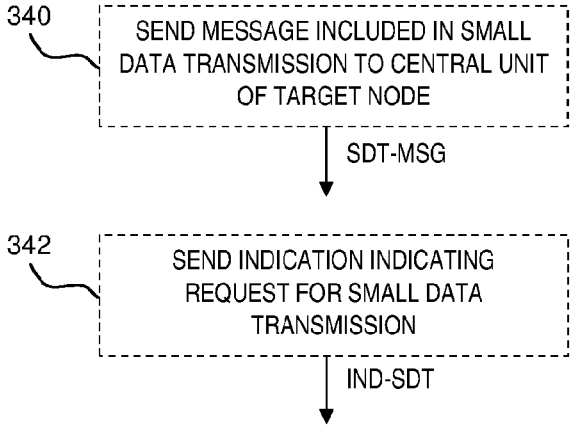

In some embodiments, FIG. 8, the instructions 106, when executed by the at least one processor 102, cause a distributed unit 12-DU (FIG. 13) of the target node 12 to perform at least one of: a) sending 340 a message SDT-MSG included in a small data transmission, e.g. in an initial uplink RRC message, to a central unit 12-CU of the target node 12, e.g. upon receiving 300 (FIG. 2) a first uplink SDT transmission UT, UT-SDT, from the terminal device 16, b) sending 342 an indication IND-SDT to a or the central unit 12-CU of the target node 12 indicating a request of the terminal device 16 for small data transmission.

In some embodiments, the distributed unit 12-DU of the target node 12 may determine whether there is a request of the terminal device 12 for small data transmission based on specific random access channel, RACH, resources.

Figure 9:
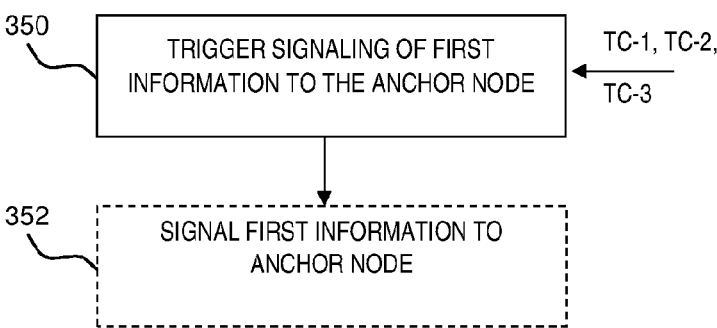

In some embodiments, FIG. 9, the instructions 106, when executed by the at least one processor 102, cause the target node 12 to trigger 350 the signalling 352 of the first information I-1 to the anchor node 14 based on receiving TC-1, at a central unit 12-CU of the target node 12, a copy of at least one of aa) a buffer status report and bb) a data volume report by a distributed unit 12-DU of the target node 12.

In some embodiments, FIG. 9, the instructions 106, when executed by the at least one processor 102, cause the target node 12 to trigger 350 the signalling 352 of the first information I-1 to the anchor node 14 based on at least one of: a) a buffer status report associated with the terminal device 16 exceeds TC-2 a predetermined threshold, b) an uplink small data transmission UT-SDT from the terminal device 16 contains TC-3 an indication that non-small data transmission ("non-SDT") data is present in a buffer of the terminal device 16. The optional block 352 symbolizes the signalling of the first information I-1 to the anchor node 14 upon the respective trigger condition TC-1, TC-2, TC-3.

In some embodiments, e.g. for the purpose of the distributed unit 12-DU of the target node 12 to inform the central unit of the target node 12, e.g. the control plane (CP) gNB-CU-CP of the central unit of the target node, of the fact that "more data is expected", an, e.g. novel, indication from the distributed unit 12-DU of the target node 12 to the central unit 12-CU of the target node 12 may be provided, which, in some embodiments, may also include e.g. a buffer status report (BSR).

In some embodiments, e.g. for the purpose of the distributed unit 12-DU of the target node 12 to inform the gNB-CU-CP of non-SDT data, an indication, e.g. novel indication, from the distributed unit 12-DU of the target node 12 to the central unit 12-CU of the target node 12 may be introduced or provided, respectively.

In some embodiments, FIG. 10, the instructions 106, when executed by the at least one processor 102, cause the target node 12 to perform at least one of: a) signalling 360 the first information I-1 after receipt of a first uplink small data transmission UT-SDT (FIG. 2), e.g. from the terminal device 16, b) signalling 362 the first information I-1 after receipt of a further, e.g. other than first, uplink small data transmission, e.g. from the terminal device 16.

In some embodiments, the signaling 302, 352 of the first information I-1 may be triggered by a reception at the target node 12 of a subsequent, i.e. further (e.g., other than first), UL SDT transmission from a terminal device 16, e.g. in a situation where an SDT transmission has been started, e.g. without anchor relocation. In some embodiments, in this case, the target node 12 may e.g. provide an indication, e.g. a novel indication, about context relocation either: 1. as a part of a subsequent message, e.g. subsequent Xn-AP RETRIEVE UE CONTEXT REQUEST message, e.g. if the context relocation is determined to be "required" or "preferred", or 2. in a new message, e.g. a new Xn-AP message, e.g. denoted "Inactive UL data transfer" message in the following without loss of generality, with or without uplink data, which may e.g. prompt the anchor node 14 to trigger the context provisioning and/or an Xn-AP handover procedure to the target node 12.

In some embodiments, the signaling 302, 352 of the first information I-1 may be triggered by a reception at the target node 12 of an indication of the terminal device 16 of new data (e.g. a scheduling request, SR, BSR, etc.), which may e.g. be received after a first UL SDT transmission UT-SDT. For example, if the indication of the terminal device 16 indicates the presence of non-SDT data in the buffer of the terminal device 16, in some embodiments this may trigger the target node 12 to initiate a context retrieve (and anchor relocation), e.g., before the data is received from the terminal device 16.

In some embodiments, the indication ind-1 (FIG. 4) that context relocation is required is triggered based on at least one of: a) receiving information that data not eligible for small data transmission is present in a buffer 16a of the terminal device 16, b) receiving information that a buffer amount of the terminal device 16 exceeds a threshold.

In some embodiments, the indication ind-1 that context relocation is required or the indication ind-2 that a context relocation is preferred includes at least one of an indication of presence of non-small data in a buffer 16a of the terminal device 16, and information related to the decision to perform a legacy connection resume.

In some embodiments, the indication ind-1' that a context relocation is not required or the indication ind-2' that a context relocation is not preferred is triggered 350 by at least one of: a) information related to a load condition of the target cell, b) information related to a capability of the target cell in respect to service and/or security support in the target cell.

In some embodiments, the indication ind-1' that a context relocation is not required or the indication ind-2' that a context relocation is not preferred includes at least one of: a) a load condition of the target cell, b) a capability of the target cell in respect to service and/or security support or in respect to a lack of service and/or security support in the target cell.

Some embodiments, FIG. 3, relate to a method, comprising: signaling 302, by a target node 12, to an anchor node 14 a first information I-1 related to a context relocation of a context CTXT of a terminal device 16, the first information I-1 e.g. characterizing a preference and/or a request of the target node 12 related to the context relocation of the context CTXT of the terminal device 16.

Figure 1B:
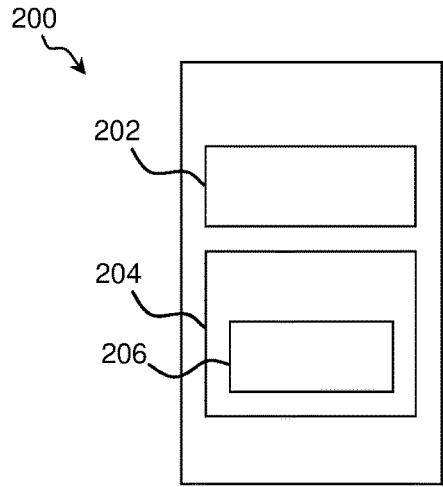

Some embodiments, FIG. 1B, relate to an apparatus 200, comprising at least one processor 202, and at least one memory 204 storing instructions 206, the at least one memory 204 and the instructions 206 configured to, with the at least one processor 202, cause an anchor node 14 (FIG. 2) to receive a first information I-1 related to a context relocation of a context of a terminal device 12.

In some embodiments, the instructions 206, when executed by the at least one processor 202, cause the anchor node 14 to perform e10 (FIG. 13) at least one of: a) checking an authorization of the terminal device, b) sending a context CTXT of the terminal device 16 to the target node 12, for example based on the first information (I-1).

In some embodiments, e.g. if the first information I-1 indicates that a context relocation is not required, the anchor node 14 does not send a context of the terminal device 16 to the target node 12.

In some embodiments, e.g. if the first information I-1 indicates that a context relocation is required, the anchor node 14 sends a context of the terminal device 16 to the target node 12.

In other words, in some embodiments, the anchor node 14 may respond to the target node either sending the context CTXT in the response to the target node or not sending the context CTXT in the response to the target node, based on the first information I-1.

Some embodiments, FIG. 11, relate to a method, comprising: receiving 400, by an anchor node 14, a first information I-1 related to a context relocation of a context of a terminal device 12. The optional block 402 of FIG. 11 symbolizes a processing of the context of the terminal device 16 based on the first information I-1.

In some embodiments, FIG. 12, the processing 402 comprises at least one of: a) checking 402*a* an authorization of the terminal device 16, b) transmitting 402*b* the context CTXT of the terminal device 16, see for example also block 330 of FIG. 7.

Figure 13:
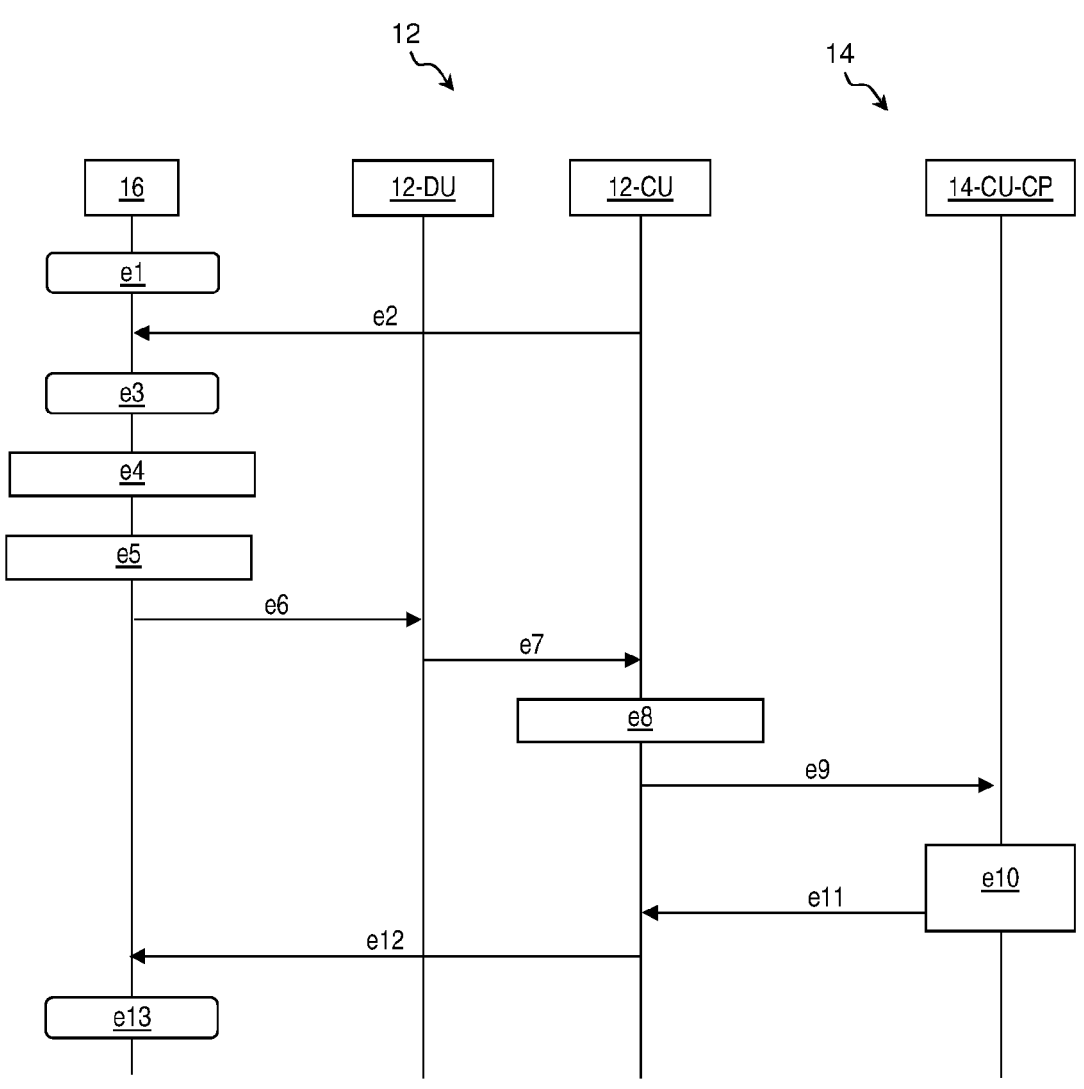

FIG. 13 schematically depicts a simplified flow chart according to some embodiments. Element e1 symbolizes the terminal device 16 being in a RRC_CONNECTED mode. Element e2 symbolizes an RRC Release message with SuspendConfig as e.g. defined in 3GPP TS 38.331, including an SDT configuration. Element e3 symbolizes the terminal device 16 being in an RRC_INACTIVE mode. Element e4 symbolizes the terminal device 16 moving to a radio cell being served by a target gNB, e.g. the target node 12 according to some embodiments. Element e5 symbolizes that new uplink SDT payload appears in an uplink buffer of the terminal device 16, and that an SDT procedure is triggered. Element e6 symbolizes an RRC Resume Request including first uplink data and optionally also including an indication of non-SDT data. Element e7 symbolizes an initial UL RRC MESSAGE, which in some embodiments may include the indication of non-SDT data. Element e8 symbolizes the control plane of the central unit 12-CU of the target node 12 determining a need to move the terminal device 16 to an RRC_CONNECTED mode based on the indication e7 of non-SDT data and triggering a forced UE context retrieval. Element e9 symbolizes a request to the anchor node 14, e.g. to the control plane 14-CU-CP of the central unit of the anchor node 14, to retrieve a UE context (e.g., "RETRIEVE UE CONTEXT REQUEST"), which may optionally include the uplink data. In some embodiments, element e9 may comprise the first information I-1 indicating that a context relocation of the terminal device 16 is required. Element e10 symbolizes the control plane 14-CU-CP of the central unit of the anchor node 14 checking an authentication of the terminal device 16 and a transmission of the context of the terminal device 16 based on the received first information I-1. Element e11 symbolizes a response to element e9, e.g. "RETRIEVE UE CONTEXT RESPONSE". Element e12 symbolizes an RRC Resume message, and element e13 symbolizes the terminal device 16 being in an RRC_CONNECTED mode.

Figure 14:
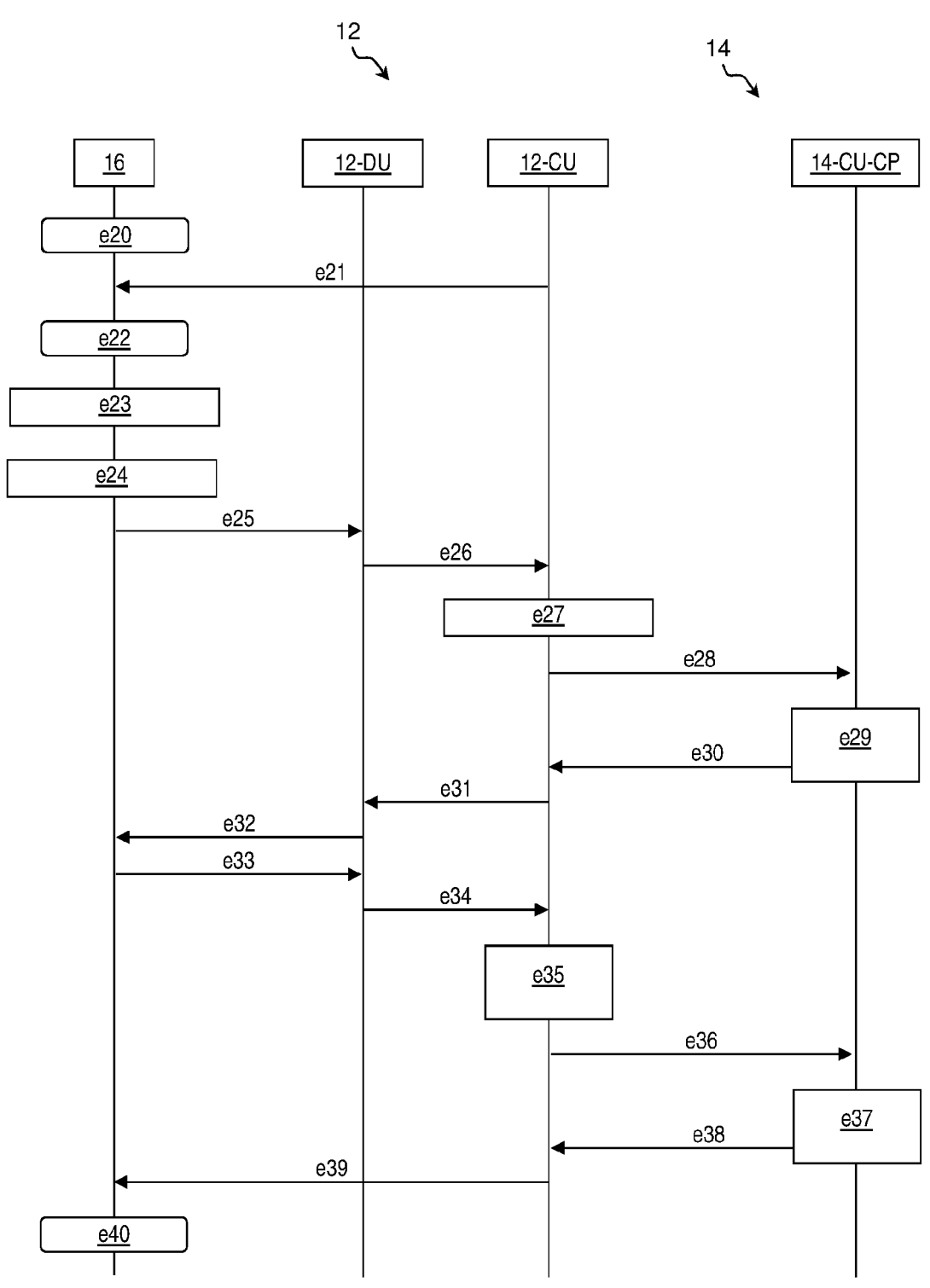

FIG. 14 schematically depicts a simplified flow chart according to some embodiments. Elements e20, e21, e22, e23, e24 of FIG. 14 correspond to elements e1, e2, e3, e4, e5 of FIG. 13. Element e25 symbolizes an RRC Resume Request including first uplink data and optionally also including a buffer status report, e.g. first buffer status report. Element e26 symbolizes an initial UL RRC MESSAGE, which in some embodiments may include the buffer status report and/or information derived on the basis of the buffer status report. Element e27 symbolizes the control plane of the central unit 12-CU of the target node 12 determining a benefit of data forwarding without context relocation e.g. based on a load. Element e28 symbolizes a request to the anchor node 14, e.g. to the control plane 14-CU-CP of the central unit of the anchor node 14, to retrieve a UE context (e.g., "RECEIVE UE CONTEXT REQUEST"), which may optionally include the uplink data. In some embodiments, element e28 may comprise the first information I-1 indicating that a context relocation of the terminal device 16 is not preferred. Element e29 symbolizes the control plane 14-CU-CP of the central unit of the anchor node 14 checking an authentication of the terminal device 16 and not transmitting the context of the terminal device 16 based on the received first information I-1. Element e30 symbolizes a "RETRIEVE UE CONTEXT FAILURE" message. Element e31 symbolizes a UE authorization ACK (acknowledge). Element e32 symbolizes a scheduling grant. Element e33 symbolizes further, e.g. second, UL data including a further, e.g. second, buffer status report.

Element e34 symbolizes an indication of subsequent SDT transmission, which may also include the second buffer status report, e.g. including an Inactive Radio network temporary identifier (I-RNTI) and/or a Cell Radio Network Temporary Identifier (C-RNTI). Element e35 symbolizes the control plane of the central unit 12-CU of the target node 12 determining a need to move the terminal device 16 to an RRC_CONNECTED mode, e.g. based on the second buffer status report, and triggering a forced UE context retrieval. Element e36 symbolizes an inactive UL data transfer message including the UL data and the first information I-1, the first information I-1 exemplarily this time indicating that a context relocation is required. Similar to element e10 of FIG. 13, element e37 of FIG. 14 symbolizes the control plane 14-CU-CP of the central unit of the anchor node 14 checking an authentication of the terminal device 16 and a transmission of the context of the terminal device 16 based on the received first information I-1 e36. Element e38 symbolizes RETRIEVE UE CONTEXT RESPONSE message. Element e39 symbolizes an RRC Resume message, and element e40 symbolizes the terminal device 16 being in the RRC_CONNECTED mode.

Figure 15:
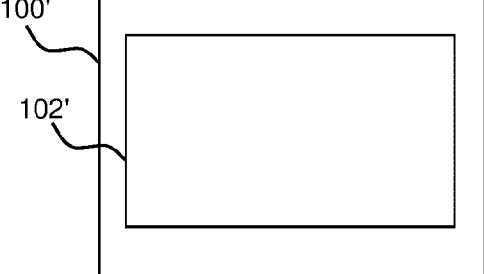

Some embodiments, FIG. 15, relate to an apparatus 100' comprising means 102' for causing a target node 12 (FIG. 2) to signal 302 (FIG. 3) to an anchor node 14 a first information I-1 related to a context relocation of a context of a terminal device 16. In some embodiments, the means 102' may e.g. comprise at least one processor, and at least one memory storing instructions, the at least one memory and the instructions configured to, with the at least one processor, perform the step 302 of causing the target node to signal to the anchor node the first information.

Figure 16:
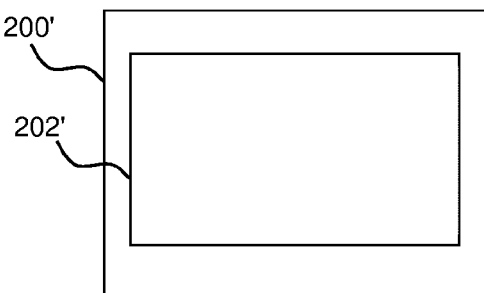

Some embodiments, FIG. 16, relate to an apparatus 200' comprising means 202' for causing an anchor node 14 to receive a first information I-1 related to a context relocation of a context of a terminal device 16. In some embodiments, the means 202' may e.g. comprise at least one processor, and at least one memory storing instructions, the at least one memory and the instructions configured to, with the at least one processor, perform the step of causing the anchor node to receive the first information.

Some embodiments, FIG. 2, relate to a wireless communications system 10 comprising at least one apparatus 100, 100', 200, 200' according to the embodiments.

Some embodiments may consider scenarios where it may be preferable that a relocation decision regarding the context of the terminal device 16 is taken by the target node 12, e.g. in contrast to the anchor node 14 deciding on the context relocation. For instance, in some embodiments the target node 12 or target gNB may want to control the decision on whether the UE's data should be served while keeping the UE 16 in an RRC_INACTIVE mode, e.g. via an SDT procedure, or in an RRC_CONNECTED mode, i.e. after moving the UE 16 to an RRC_CONNECTED mode. For example, in some embodiments, the target node 12 may prefer to serve the UE's data in RRC_CONNECTED mode if the amount of data to be transferred in RRC_INACTIVE mode is expected to be too large (and thus inefficient in radio usage) or in case non-SDT data is also present in the UE buffer (which may e.g. not be served by an SDT procedure).

As mentioned above, in some embodiments, the terminal device 16 may indicate a presence e.g. of non-SDT data and new data, respectively, during an SDT procedure.

13

What is claimed is:

1. An apparatus, comprising:

a target node:

at least one processor; and at least one memory storing instructions, the at least one memory and the instructions configured to, with the at least one processor, cause the apparatus to perform the following operations:

cause the target node to signal to an anchor node that is a last serving next generation NodeB (gNB) acting as the anchor node for the apparatus, a first information related to a context relocation of a context of a terminal device, wherein the first information comprises: an indication that the context relocation is required, and an indication that the context relocation is preferred, wherein the indication that context relocation is required is based on the following: a detection that non-small data transmission (non-SDT) data is present in a buffer of the terminal device and that the buffer amount exceeds a predetermined threshold, and wherein the signaling is carried in a Xn-Application Protocol (Xn-AP) Retrieve User Equipment (UE) Context Request message that piggybacks uplink data of the terminal device receiving information that data not eligible for small data transmission is present in a buffer of the terminal device, and receiving information that a buffer amount of the terminal device exceeds a threshold, wherein the indication that context relocation is required comprises an indication of presence of non-small data in a buffer of the terminal device, and information related to the decision to perform a legacy connection resume;

controlling a context relocation decision;

influencing a decision related to the context relocation;

indicating that the target node leaves the decision related to the context relocation to another node; and cause the target node to trigger the signalling of the first information to the anchor node based on a buffer status report associated with the terminal device exceeding a predetermined threshold, and an uplink small data transmission (UT-SDT) from the terminal device contains an indication that non-small data transmission data is present in the buffer of the terminal device.

2. The apparatus according to claim 1, wherein the instructions, when executed by the at least one processor, cause the target node to determine whether the context relocation is preferred, and, optionally, to signal the preference.

3. The apparatus according to claim 2, wherein the instructions, when executed by the at least one processor, cause the target node to receive the context of the terminal device, and, optionally, to operate as an anchor node for the terminal device.

4. The apparatus according to claim 3, wherein the instructions, when executed by the at least one processor, cause a distributed unit of the target node to perform at least one of: a) sending a message (SDT-MSG) included in a small data transmission to a central unit of the target node, b) sending an indication (IND-SDT) to a or the central unit of the target node indicating a request of the terminal device for small data transmission.

5. The apparatus according to claim 4, wherein the instructions, when executed by the at least one processor, cause the target node to trigger the signalling of the first information to the anchor node based on receiving (TC-1), at a central unit of the target node, a copy of at least one of aa) a buffer status report and bb) a data volume report by a distributed unit of the target node.

6. The apparatus according to claim 5, wherein the instructions, when executed by the at least one processor, cause the target node to perform: a) signalling the first information after receipt of a first uplink small data transmission from the terminal device, b) signalling the first information after receipt of a further uplink small data transmission from the terminal device.

* * * * *